United States Patent Office 3,126,377
Patented Mar. 24, 1964

3,126,377
PYRIDAZONYL-PHTHALOCYANINES
Arnold Tartter, Lambsheim, Pfalz, Hans Ruprecht Hensel, Heidelberg, and Hans Baumann, Ludwigshafen (Rhine), Germany, assignors to Badische Anilin- & Soda-Fabrik Aktiengesellschaft, Ludwigshafen (Rhine), Germany
No Drawing. Filed Aug. 9, 1960, Ser. No. 48,365
Claims priority, application Germany Aug. 17, 1959
1 Claim. (Cl. 260—242)

This invention relates to new phthalocyanine dyes which contain halogenpyridazone-(6) radicals in the molecule.

It is an object of this invention to provide novel blue and green dyes which are particularly suitable for dyeing and printing textile materials of wool, silk, synthetic linear polyamides and especially cellulose. Textile materials include fibers, flock, threads and woven and non-woven textiles. Synthetic linear polyamides are above all nylon 6, nylon 66 and nylon 11. The term "cellulose" includes not only native cellulose, such as cotton, but also regenerated cellulose, as for example rayon and rayon staple.

Another object of the invention is to provide a process for the production of the said novel phthalocyanine dyes.

Further objects of the invention will become evident from the following detailed description of our invention.

The new phthalocyanine dyes of this invention have the general formula:

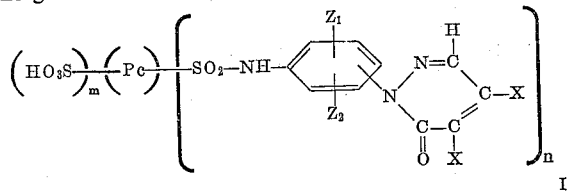

I in which Pc represents the radical of copper pthalocyanine, a chlorcopper phthalocyanine with 1 to 4 chlorine atoms in the molecule, a phenylcopper, phthalocyanine with 1 to 4 phenyl radicals in the molecule or nickel phthalocyanine, X a chlorine or bromine atom, $m$ a whole number from 0 to 5 and $n$ one of the whole numbers from 1 to 4, the sum of $m$ and $n$ being not more than 6, and $Z_1$ represents a hydrogen atom, a methyl group, a methoxy group or a chlorine atom and $Z_2$ a hydrogen atom or a sulfonic acid group.

The dyes of the Formula I may not only be present in the form of the free sulfonic acids but also as alkali metal salts, for example sodium or potassium salts, or as ammonium salts.

The said dyes may be prepared by various methods.

These dyes are obtained for example by reaction of one mol of a phthalocyanine sulfonic acid chloride of the general formula:

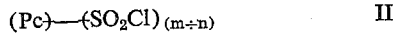

II with $n$ mols of an aminophenylpyridazone-(6) of the general formula

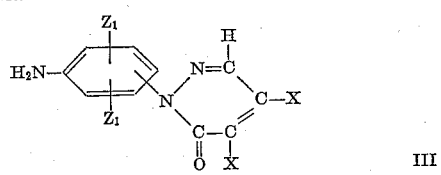

III

Pc, X, $Z_1$, $Z_2$, $m$ and $n$ having the meanings given above.

The reaction of the said phthalocyanine sulfonic acid chlorides with the said aminophenylpyridazones-(6) may be carried out for example in aqueous liquids at room temperature or a temperature not deviating too greatly therefrom, for example at temperatures of 0° to 50° C., advantageously in the presence of acid-binding agents, such as alkali hydroxides, carbonates, hydrogen carbonates and/or acetates. For example, if for each equivalent of phthalocyanine sulfonic acid chloride one mol or more of the aminophenylpyridazone-(6) in question is used, practically all the sulfonic acid halide groups can be converted into the corresponding substituted sulfonic acid amide groups. However, if less than one mol of aminophenylpyridazone is used for each equivalent of tetrazaporphin sulfonic acid halide, reaction products are obtained which contain sulfonic acid chloride groups in the molecule. These are then converted in known manner into sulfonic acid radicals in so far as saponification has not occurred during the reaction. However, part of the sulfonic acid halide groups of the phthalocyanine derivative may also be converted prior to the reaction into sulfonic acid groups in the usual way by hydrolysis and the reaction product then reacted with the aminophenylpyridazone.

Phthalocyanine sulfonic acid chlorides of the Formula I are prepared in the usual way, for example by heating the phthtalocyanines in question with chlorosulfonic acid. It is preferred to use for the preparation of the new dyes according to the invention, phthalocyanine sulfonic acid chlorides which contain more than one sulfonic acid chloride group, for example three or four sulfonic acid chloride groups, in the molecule.

Aminophenylpyridazones-(6) of the Formula III include 1-(3-aminophenyl)-4,5-dichloropyridazone-(6), 1-(4 - aminophenyl) - 4,5 - dichloropyridazone - (6), 1-(3 - amino - 4 - chlorpehnyl) - 4,5 - dichloropyridazone-(6), 1 - (3 - amino - 6 - sulfophenyl) - 4,5 - dichloropyridazone-(6) and 1-(3-amino-6-sulfophenyl)-4,5-dibromopyridazone-(6).

Aminophenylpyridazones-(6) of the Formula III are obtained for example by heating acetylaminophenylhydrazonium chlorides of the general formula:

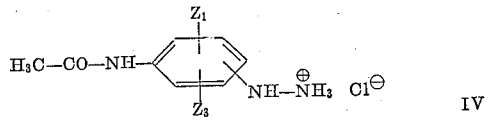

IV with mucochloric or mucobromic acid of the formula:

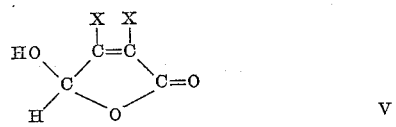

V in a mixture of anhydrous acetic acid and acetic anhydride and saponification of the acetylamino groups in the reaction product to amino groups in the usual way, $Z_1$, $Z_2$ and X having the meanings given above.

The acetylaminophenylhydrazonium chlorides of the Formula IV necessary for this reaction may be prepared by diazotization of the corresponding aminoacetylaminobenzenes and reduction of the resultant diazonium compound.

Another possibility for obtaining aminophenylpyridazones(6) or the Formula III consists in reacting nitrophenylhydrazines of the formula:

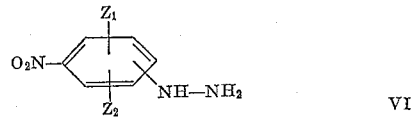

VI with mucochloric or mucobromic acid under the reaction conditions specified above and reducing the resultant nitrophenylpyridazones-(6) to the corresponding aminopyridazones-(6).

For the production of dyes which are difficultly soluble in water as many sulfonic acid chloride groups of the phthalocyanine derivatives as possible are reacted with the said aminophenylpyridazones-(6). Water-soluble dyes are obtained when the reaction with the aminophenylpyridazones-(6) does not embrace all the sulfonic acid chloride groups of the phthalocyanine derivative and the finished dyestuff contains sulfonic acid radicals in the molecule. Water-solubility may also be brought about by the sulfonic acid group shown in Formula I by $Z_2$.

Another process for the production of dyes of the Formula I may be carried out by reacting one mole of a phthalocyanine sulfonic acid chloride of the Formula II with $n$ mols of an aminophenylhydrazone of the general formula:

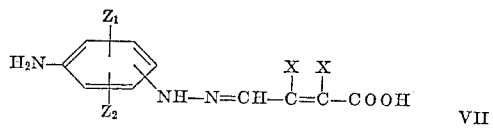

VII in which X, $Z_1$ and $Z_2$ having the meanings given above, and treating the reaction products with mineral acids.

In the mineral acid treatment, pyridazone derivatives are formed according to the following scheme:

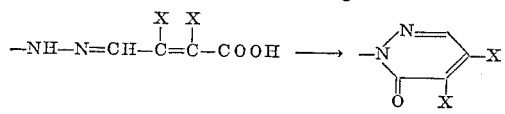

The mineral acids which effect the cyclization are used either in anhydrous or substantially anhydrous form or in the form of dilute aqueous solutions. If cyclization is carried out with aqueous solutions of mineral acids, for example dilute sulfuric acid or dilute hydrochloric acid, it is advantageous to work at elevated temperatures, for example at 60° C., up to the boiling point of the mineral acid solutions. When using anhydrous or substantially anhydrous acids, as for example 96% sulfuric acid, cyclization proceeds at satisfactory speed even at room temperature or moderately elevated temperature, as for example 40° C.

Suitable aminophenylhydrazones of the Formula VII include the compounds of the following table:

(1) H₂N—⟨phenyl⟩—NH—N=CH—CCl=CCl—COOH (2) H₂N
⟨phenyl⟩—NH—N=CH—CCl=CCl—COOH (3) H₂N
HO₃S—⟨phenyl⟩—NH—N=CH—CCl=CCl—COOH (4) H₂N
⟨phenyl⟩—NH—N=CH—CCl=CCl—COOH
SO₃H (5) HO₃S
⟨phenyl⟩—NH—N=CH—CCl=CCl—COOH
NH₂

The above compounds are obtained for example by reaction of the corresponding phenyl hydrazines with mucochloric acid in aqueous mineral acid solution at room temperature.

What has been said above also holds good for the conditions in the reaction of the phthalocyanine derivatives of Formula II with the aminophenyl hydrazones of Formula VII. According to a third process, the dyestuffs of Formula I are obtained, for example, when one mol of a phthalocyanine derivative of the general formula:

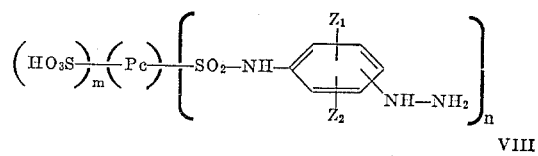

VIII is reacted with $n$ mols of mucochloric or mucobromic acid in aqueous solution or suspension at room temperature or at elevated temperature, for example 50° to 100° C., and the reaction product is treated with mineral acids, or when the reaction of the phthalocyanine derivatives of Formula VIII with mucochloric or mucobromic acid is carried out at elevated temperature, for example 70° to 100° C., in aqueous mineral acid solutions, Pc, $Z_1$, $Z_2$, $m$ and $n$ having the meanings given above.

The reaction conditions described above hold good for the treatment of the reaction products with mineral acids.

As an example of a compound of the Formula VIII there may be specified that of the following constitution:

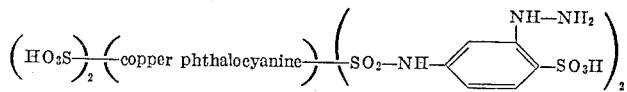

This is obtained by reaction of one mol of copper phthalocyanine tetrasulfonic acid chloride with 2 mols of 1,3-diaminobenzene-4-sulfonic acid, diazotization of the reaction product and reduction of the diazo compound formed to the corresponding hydrazine derivative.

The new dyes of the Formula I are eminently suitable for dyeing and printing textile materials of wool, silk, linear synthetic polyamides, and also especially of native or regenerated cellulose. The co-employment of acid-binding agents in the dye-baths, padding liquors or printing pastes is advantageous. Dyes of difficult solubility in water may if necessary be used in dispersed form. Dispersion is carried out with the usual dispersing agents.

The dyes may be dyed for example onto cotton in the presence of basic-reacting substances as acid-binding agents, such as alkali hydroxides, carbonates and hydrogen carbonates, and advantageously of neutral salts, for example sodium sulfate, from aqueous baths. Solutions of the new dyes may for example also be padded onto cotton fabric, possibly with the co-employment of any conventional dyeing auxiliary, the material to be dyed then dried and the dyes fixed on the fiber in the presence of the above-mentioned basic-reacting substances by steaming or treatment with hot air. The basic-reacting substances may be directly added to the padding liquor or they may be applied to the padded fabric by means of a second padding bath.

Cellulose fabrics can be printed in an analogous manner with the use of any conventional printing auxiliary, as for example thickening agents.

Dyeings and prints of very good fastness to light and wet treatment are obtained.

The following examples will further illustrate this invention, but the invention is not restricted to these examples. The parts are parts by weight.

*Example 1*

50 parts of copper phthalocyanine are heated together with 400 parts of chlorsulfonic acid for 4 hours while stirring at 130° to 135° C. The cooled mixture is poured into ice-water, the reaction product filtered off and washed with cold water. Then it is made into a paste with 300 parts of ice-water and, while stirring, there is added thereto a solution of 120 parts of the compound of the formula:

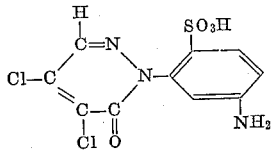

and 75 parts of crystallized sodium acetate in 500 parts of water. By adding aqueous 10% carbonate solution, the pH of the reaction mixture is maintained at about 5 and the whole stirred at room temperature until the pH no longer changes without the addition of sodium carbonate solution. Then such an amount of dilute hydrochloric acid is added that a pH of about 3 is set up, the dye formed is precipitated with sodium chloride, filtered off and washed free from water with acetone. 190 parts of a water-soluble blue dye are obtained.

If cotton cambric is padded with a solution which contains 20 g. of the dye per liter, dried, again padded with a solution which contains 20 g. of sodium hydrogen carbonate and 300 g. of sodium sulfate per liter, and the dyed material steamed for eight minutes at 100° C., there is obtained, after rinsing and soaping, a turquoise blue dyeing of good fastness to light and wet treatment. Similar blue dyes are obtained by using 1-(2-amino-4-sulfophenyl)-4,5-dichlorpyridazone-(6) or 1-(4-amino-2-methoxy-5-sulfophenyl)-4,5-dichlorpyridazone-(6) instead of 1-(3-amino-6-sulfophenyl)-4,5-dichlorpyridazine-(6).

*Example 2*

300 parts of an aqueous paste which contains 50 parts of monochlorcopper phthalocyanine tetrasulfonic acid chloride are stirred at 0° C. with a solution of 25 parts of 1-(3-amino-6-sulfophenyl)-4,5-dichlorpyridazone-(6) and 15 parts of sodium acetate in 100 parts of water and the pH of the reaction mixture is maintained at 5.0 to 5.2 by adding sodium hydrogen carbonate. After stirring for several hours at room temperature, the pH of the mixture is adjusted to about 3 by adding hydrochloric acid, the reaction product precipitated with sodium chloride, filtered off and dried. The reaction product is a mixture of the dye of the formula:

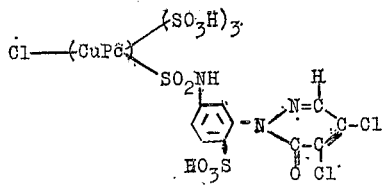

and the dye of the formula:

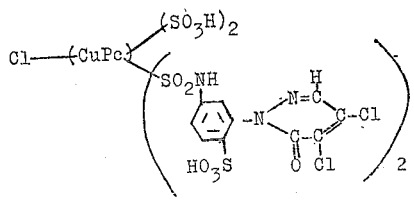

(CuPc) being the radical of copper phthalocyanine.

The mixture dyes cotton fast turquoise blue shades. If dichlor-, trichlor-, or tetra-chlorcopper phthalocyanine tetrasulfonic acid chloride or nickel phthalocyanine tetrasulfonic acid chloride be used instead of monocolorcopper phthalocyanine tetrasulfonic acid chloride, greenish blue dyes are obtained.

*Example 3*

15 parts of a copper phthalocyanine tetrasulfonic acid chloride (which has been prepared by reacting a mixture of equal parts of 3- and 4-sulfophthalic acid with copper salts in a urea melt and converting the resultant sulfonic acid into the corresponding sulfonic acid chloride) in the form of an aqueous paste are made into a paste with 100 parts of ice and a solution of 5 parts of 1-(3-aminophenyl)-4,5-dichlorpyridazone-(6) in a mixture of 70 parts of water and 20 parts of 10% hydrochloric acid. To this paste such an amount of saturated aqueous sodium acetate solution is gradually added that a pH of 4 is maintained. The mixture is stirred for several hours, a pH of about 5 being set up by adding saturated aqueous sodium carbonate solution. The reaction product is then precipitated with sodium chloride and dried at moderately elevated temperature under diminished pressure. A water-soluble turquoise blue dye is obtained.

Dyes with similar properties are obtained by using, instead of 1-(3-aminophenyl)-4,5-dichlorpyridazone-(6), 1-(3-amino-6-sulfophenyl)-4,5-dibrompyridazone-(6), 1-(4-aminophenyl)-4,5-dichlorpyridazone-(6), 1-(2-amino-4-methylphenyl))-4,5-dichlorpyridazone-(6), 1-(3-amino-4-chlorphenyl)-4,5-dichlorpyridazone-(6), 1-(2-amino-4,6-dichlorphenyl)-4,5-dichlorpyridazone-(6) or 1-(4-amino-2-methoxy-5-chlorphenyl)-4,5-dichlorpyridazone-(6) and/or, instead of copper phthalocyanine-3,3',4'',4'''-tetrasulfonic acid chloride, copper phthalocyanine-3,3',3'', 3'''- or 4,4'4'',4'''-tetrasulfonic acid chloride.

*Example 4*

20 parts of copper phthalocyanine are heated for 2½ hours 200 parts of chlorsulfonic acid at 120° to 125° C. The reaction product is poured into ice-water, filtered off and washed with cold water. In the form of an aqueous paste it is then slurried at about 0° C. in a solution of 18 parts of 1-(3-amino-6-sulfophenyl)-4,5-dichlorpyridazone-(6) and 12 parts of crystallized sodium acetate in 200 parts of water. This mixture is stirred for 15 hours at 20° to 25° C., a pH of 4.9 being maintained by adding saturated aqueous sodium carbonate solution. The dye formed is precipitated with sodium chloride, filtered off and washed free from water with acetone. It dyes cotton fast turquoise blue shades.

Reddish blue dyes are obtained when diazacopper phthalocyanine disulfonic acid chloride or tetramethyldibenzotetraza-nickel porphin disulfonic acid chloride is used instead of copper phthalocyanine disulfonic acid chloride.

*Example 5*

A solution of 30 parts of tetraphenylcopper phthalocyanine in 300 parts of chlorsulfonic acid is gradually heated to 120° C., kept for about an hour at 120° to 125° C. and then heated for 5 hours at 130° to 135° C. After cooling, the solution is added to 2000 parts of ice, the reaction product filtered off and washed with ice-water. In the form of an aqueous paste it is then slurried at about 0° C. in a suspension of 26 parts of 1-(4-aminophenyl)-4,5-dichlorpyridazone-(6) in 120 parts of N-methylpyrrolidone and a solution of 25 parts of crystallized sodium acetate in 40 parts of water is added. This mixture is stirred first for some hours in the cold and then for about 12 hours at 20° to 25° C., a pH of 5 to 6 being maintained by adding saturated aqueous sodium carbonate solution. The reaction product is precipitated with potassium chloride, filtered off and dried at about 40° C. under reduced pressure. A water-soluble green dye is thus obtained.

Similar dyes are obtained by reacting in an analogous manner 44 parts of tetraphenylcopper phthalocyanine tetrasulfonic acid chloride with 18 parts of 1-(4-aminophenyl)-4,5-dichlorpyridazone-(6), or 40 parts of tetraphenylcopper phthalocyanine trisulfonic acid chloride with 10 parts of 1-(4-aminophenyl)-4,5-dichlorpyridazone-(6).

*Example 6*

250 parts of an aqueous paste which contains 34 parts of diphenylcopper phthalocyanine tetrasulfonic acid chloride are stirred at 0° C. with a solution of 30 parts of 1-(4-amino-5-sulfophenyl) - 4,5 - dischlorphyridazone-(6) and 20 parts of sodium acetate in 200 parts of water and the reaction mixture is kept weakly acid to neutral by adding a saturated aqueous sodium carbonate solution. After stirring for about 10 hours at room temperature, the solution is adjusted to pH 2 to 3 and the dye salted out in the usual way. The dye which is filtered off and dried at moderate temperature under reduced pressure, dissolves in water with a blue-green color.

Similar blue-green dyestuffs are obtained by reacting 46 parts of diphenylcopperphthalocyanine tri- or 80 parts of diphenylcopperphthalocyanine di-sulfonic acid chloride instead of 34 parts of diphenylcopperphthalocyanine tetra-sulfonic acid chloride, or only 20, 15 or 10 parts of 1-(4-amino-5-sulfophenyl)-4,5-dichlorphyridazone-(6) instead of 30 parts.

The dye which is obtained in an analogous manner from triphenylcopper phthalocyanine tetrasulfonic acid chloride is clearly greener, whereas the dye resulting from phenyl copper phthalocyanine tetrasulfonic acid chloride has only a slight green tinge.

*Example 7*

30 parts of copper phthalocyanine in 250 parts of chlorsulfonic acid are slowly heated to 125° C. and, after reaction for an hour, for four hours at 130° to 135° C. The mixture is allowed to cool, poured into ice-water, the precipitate filtered off and washed with cold water.

The moist filter cake obtained is made into a paste with 250 parts of crushed ice, the mixture neutralized with dilute caustic soda solution and stirred with a solution of 45 parts of aminophenyl hydrazone of the formula:

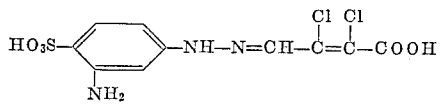

and 35 parts of crystallized sodium acetate in 700 parts of water. By slowly adding 10% aqueous sodium carbonate solution, the reaction mixture is kept weakly acid to neutral. After stirring for ten hours at room temperature such an amount of dilute sulfuric acid or hydrochloric acid is added to the mixture that a pH of about 1 is set up therein, 150 parts of sodium sulfate or sodium chloride are added thereto and after standing for a short time the reaction product is filtered off. The residue is introduced into 600 parts of an about 12% aqueous hydrochloric acid, the resultant suspension heated for 3 to 4 hours at 80° to 90° C. while stirring and the dye filtered off. The residue may also be introduced with cooling into 1300 parts of 96% sulfuric acid and the mixture stirred for about 10 hours at 30° to 40° C. It is then poured into a mixture of ice and saturated sodium chloride solution, the precipitate filtered off and dried at moderate temperature. There are obtained about 90 parts of a blue dye which is readily soluble in water.

Cotton cambric is padded with an aqueous solution which contains 30 g. of this dye per liter, the dyed goods dried and again padded with an aqueous solution which contains 20 g. of sodium hydrogen carbonate and 300 g. of sodium sulfate per liter. The dyed material is steamed for 8 minutes at 100° C., rinsed and soaped. A turquoise blue dyeing of excellent fastness to light and wet treatment is obtained.

By using nickel phthalocyanine or tetraphenylcopper phthalocyanine tetrasulfonic acid chloride instead of the copper phthalocyanine sulfonic acid chloride described in the first paragraph of this example, a greenish blue or green dye with similar properties is obtained.

A water-soluble turquoise blue dye is obtained when, instead of the aminoaryl hydrazone specified in the second paragraph of this example, there is used the corresponding compound free from sulfonic acid groups. Cyclization is carried out for example by boiling in 10% aqueous hydrochloric acid.

*Example 8*

100 parts of the compound of the formula:

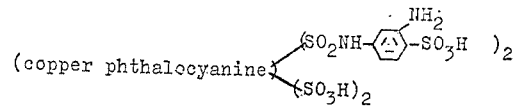

with an amino equivalent of 980 are dissolved in 400 parts of a 2% aqueous caustic soda solution, 7 parts of sodium nitrite are added and the whole is allowed to flow into a mixture of 70 parts of concentrated hydrochloric acid and 200 parts of ice-water. The whole is stirred until the diazotization has ended and then the diazo solution is allowed to flow into a solution of 50 parts of crystallized tin (II) chloride in 300 parts of water. The reduction is ended after a few minutes. The hydrazino compound of the formula:

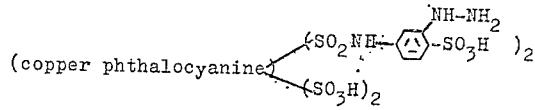

obtained is filtered off, stirred with 500 parts of 10% aqueous hydrochloric acid, 25 parts of mucochloric acid added and the mixture boiled while stirring for one to two hours. The reaction product is filtered off, washed with water and dried at 70° C. A dye is obtained in a yield of about 115 parts which dyes wool, synthetic linear polyamides and especially cotton or regenerated cellulose turquoise blue shades in the presence of acid-binding agents. The dyeings exhibit excellent fastness to light and outstanding wet fastness properties. Instead of the above-mentioned hydrazino compound there may be used the reaction product of 1 mol. of copper phthalocyanine tetrasulfonic acid chloride and 2 mols of 1-acetylhydrazino-4-aminobenzene; the dye then obtained dissolves in water in the presence of weak bases with a turquoise blue color.

We claim:

A phthalocyanine dye of the formula:

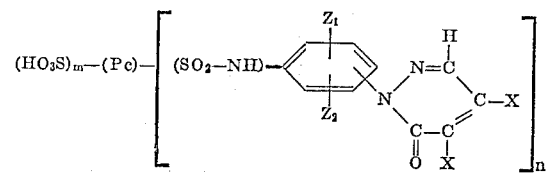

in which Pc represents the radical of a member selected from the class consisting of copper phthalocyanine, mono-, di-, tri- and tetrachloro copper phthalocyanine, mono-, di-, tri- and tetraphenyl copper phthalocyanine and nickel phthalocyanine, X is a member selected from the class consisting of a chlorine atom and a bromine atom, $Z_1$ is a member selected from the class consisting of a hydrogen atom, a chlorine atom, a methyl group and a methoxy group, $Z_2$ is a member selected from the class consisting of a hydrogen atom and a sulfonic acid radical, $m$ is one of the numbers 0, 1, 2, 3, 4 and 5, $n$ is one of the whole numbers 1 to 4 and the sum of $m$ and $n$ is one of the whole numbers 1 to 6.

References Cited in the file of this patent

UNITED STATES PATENTS

| | | |
|---|---|---|
| 2,459,771 | Fox | Jan. 18, 1949 |
| 2,628,181 | Mowry | Feb. 10, 1953 |
| 2,776,957 | Bretano et al. | Jan. 8, 1957 |

UNITED STATES PATENT OFFICE
CERTIFICATE OF CORRECTION

Patent No. 3,126,377 March 24, 1964

Arnold Tartter et al.

It is hereby certified that error appears in the above numbered patent requiring correction and that the said Letters Patent should read as corrected below.

Column 1, line 57, for "(m÷n)" read -- (m+n) --; column 2, lines 39 to 43, for that portion of the formula reading $$\mid \atop Z_3 \qquad \text{read} \qquad \mid \atop Z_2$$

Signed and sealed this 20th day of October 1964.

(SEAL)
Attest:

ERNEST W. SWIDER
Attesting Officer

EDWARD J. BRENNER
Commissioner of Patents